United States Patent

[11] 3,578,304

[72] Inventors Wolfgang Hasselbach
Konigstein;
Heinz Heim, Egelsbach, Germany
[21] Appl. No. 782,530
[22] Filed Dec. 10, 1968
[45] Patented May 11, 1971
[73] Assignee Braun Aktiengesellschaft
Frankfurt, Main, Germany
[32] Priority Dec. 14, 1967
[33] Germany
[31] P 15 72 419.3

[54] APPARATUS FOR DAMPING OSCILLATIONS
9 Claims, 3 Drawing Figs.
[52] U.S. Cl. ................................................ 267/121
[51] Int. Cl. ................................................ F16f 5/00
[50] Field of Search ........................................ 267/121,
124, 127, 151, 180, 182

[56] References Cited
UNITED STATES PATENTS
3,368,824  2/1968  Julien .......................... 267/1(21)
FOREIGN PATENTS
659,230  9/1935  Germany ...................... 267/1(21)
Primary Examiner—James B. Marbert
Attorney—Michael S. Striker ABSTRACT: A shock absorber for electroacoustical instruments such as record players also suppresses oscillations in the audible frequency range which interfere with the quality of the reproduced sound. The dual function of the shock absorber is carried out by a combination of dampers in a system providing three-dimensional freedom of motion. The shock absorber thus is an acoustic filter for periodic and aperiodic oscillations with varying amplitude-frequency characteristics.

Patented May 11, 1971

Inventor
WOLFGANG HASSELBACH
HEINZ HEIM

By: Michael I. Kroker
Attorney

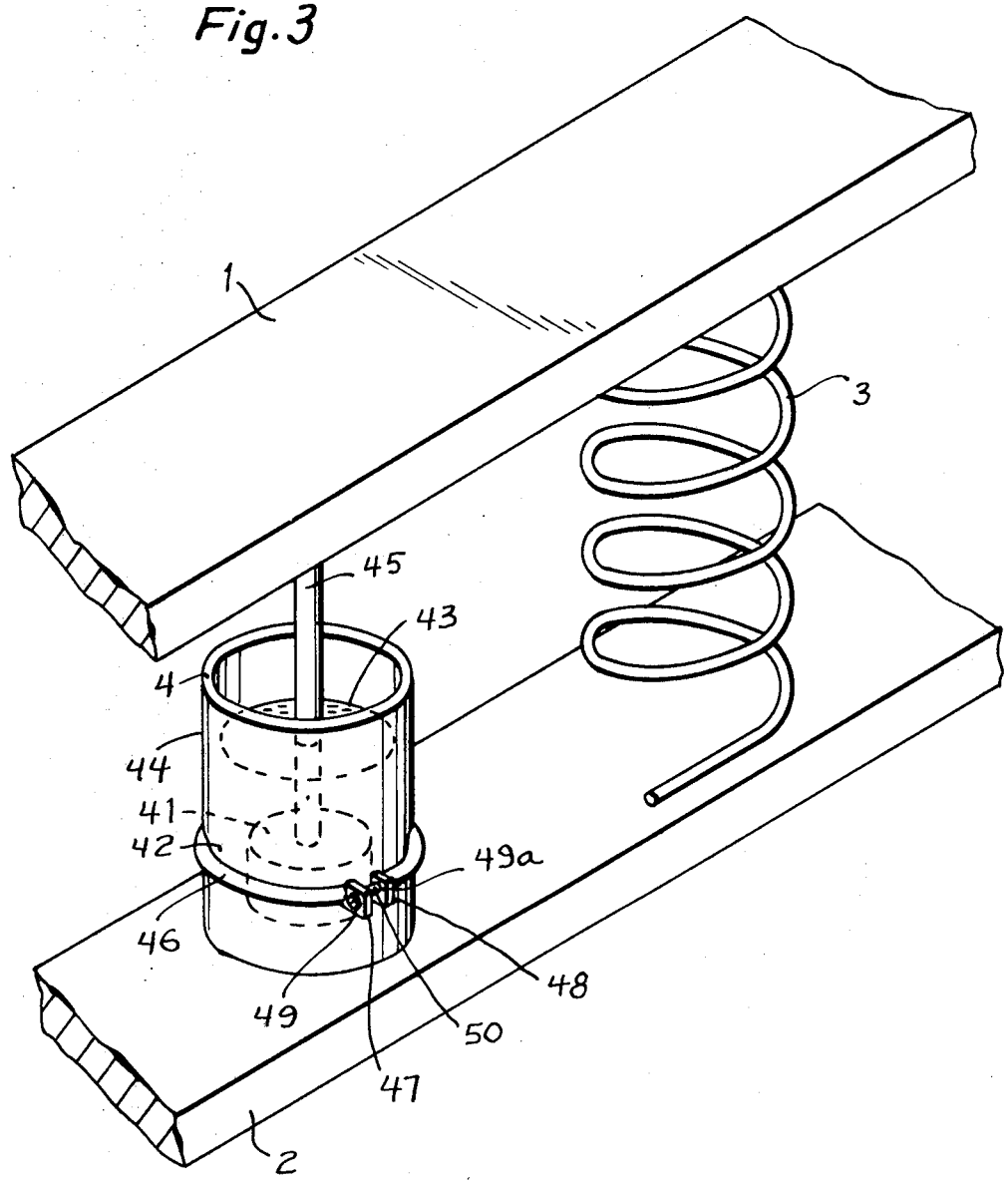

3,578,304

APPARATUS FOR DAMPING OSCILLATIONS

BACKGROUND OF THE INVENTION

This invention relates to damping means or shock absorbers for electroacoustical instruments and, more particularly, to shock absorbers to be used in connection with sound reproducing instruments such as record players.

The function of such shock absorbers is to cushion the mechanism against dislocations and to suppress oscillations in the audible frequency range which are produced by the dislocations. The oscillations may be due to impacts transmitted from the environment, or they may be generated by the movements of structural components of the instruments, for example, by the drive mechanism. In either case they cause an intrusion of undesirable noise which interferes with the quality of the sound that is to be reproduced.

Shock absorbers for electroacoustical instruments which have been developed in prior art consist mainly of highly yieldable rubber or metal springs on which the instruments are supported. Dampers in the form of foam rubber or sponge rubber are sometimes coordinated with the springs; in some applications the springs themselves are made from material with damping properties. These and similar solid shock absorbers have been quite satisfactory for general purposes; but they are not adequate for the sophisticated and highly sensitive instruments which have come into use in recent years. In particular, they cannot cope with oscillations of very low frequencies (below 4 Hz.) which are desirable characteristic frequencies of structural components of current electroacoustical instruments. Nor can such shock absorbers have aperiodic damping characteristics, especially for oscillations which extend in two or more dimensions.

Fluid shock absorbers instead of the solid devices are also of limited use with respect to electroacoustical instruments since they can only damp one-directional or linear oscillations. Moreover, fluid shock absorbers of the conventional type have the disadvantage of introducing noise which results from the internal friction of the fluid, and from the friction of a piston moving with respect to a sealing means. Finally, fluid shock absorbers cannot damp anisotropic oscillations which develop in electroacoustical instruments where individually mounted structural components may oscillate simultaneously in different directions and with different modes.

SUMMARY OF THE INVENTION

It is, therefore, an object of this invention to overcome the drawbacks of prior art and to provide a shock absorber for electroacoustical instruments which effectively damps oscillations over a wide amplitude-frequency range.

Another object is to provide a shock absorber for electroacoustical instruments which is capable of damping oscillations to any extent, including the aperiodic case and arriving from different directions.

Yet another object is to provide a shock absorber for electroacoustical instruments which can be adjusted to damp selected oscillations.

A further object is to provide a shock absorber for electroacoustical instruments which is simple to construct and install and which gives reliable and durable performance.

These objects and others, which will become apparent hereinafter, are provided by a fluid damping element or a combination of solid and fluid damping elements. The fluid element comprises a container with damping fluid in which a piston has three-dimensional freedom of motion. A piston rod, which connects the piston with the oscillating components of the electroacoustical instruments, transmits the oscillations. The diameter of the piston itself is smaller than the diameter of the container in which it is housed, so that a fluid-filled gap exists between the circumference of the piston and the container wall. Energy-consuming turbulence which may be produced in the fluid by the mechanical vibrations can be dissipated by adjusting the width of the gap, by the shape of the piston, by preselecting the viscosity of the damping fluid, or by a combination of these adjustments.

The solid resilient component of the shock absorber is a spring which is mounted parallel with the fluid element. It is connected at one end with the oscillating instrument component and at the other end to the structure which also supports the fluid container. It may be housed in the fluid container itself and abuttingly supported in grooves formed respectively in the piston rod and in the container wall, so that the reciprocal motion of the piston is accompanied by a simultaneous stretching and compressing of this spring.

In a preferred embodiment of our invention the container for the damping fluid is made from elastic material and can be compressed by clamping means around its periphery in order to selectively vary the width of the gap between the piston circumference and the container wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a perspective view of a further embodiment of our invention.

DESCRIPTION OF THE PREFERRED EMBODIMENTS

Figure 1:
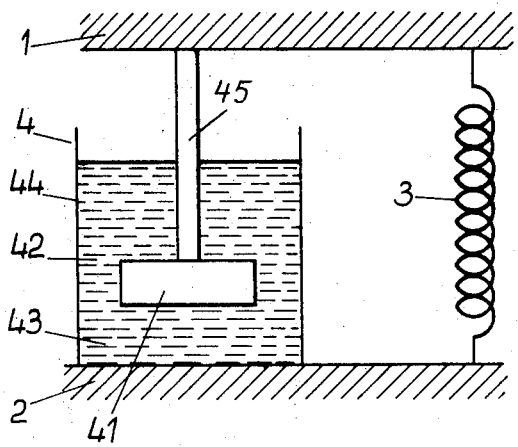
FIG. 1 is a schematic sectional view of a shock absorber according to our invention.

FIG. 1 shows a base 2 and a member 1 transmitting the oscillations which are to be damped. A helical spring 3 connects base 2 and member 1. A fluid damper 4 rests on base 2 and includes a container 44 confining a damping fluid 43 of preselected viscosity. A piston 41 which is attached to the piston rod 45 is movable in the fluid 43, the diameter of the piston being such that a gap 42 is formed between the outer circumference of the piston and the wall of the container 44. The piston rod 45 is connected to the member 1.

Figure 2:
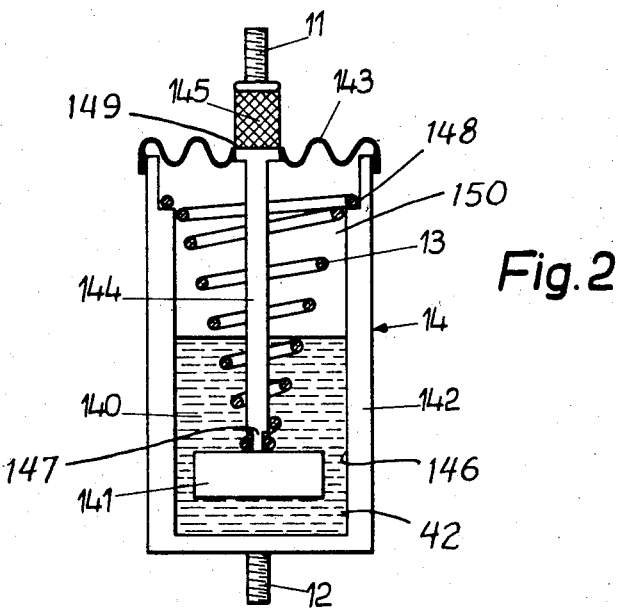
FIG. 2 is a sectional view of another embodiment of our invention.

In FIG. 2, which shows another embodiment of the invention, the fluid damping assembly 14 and the solid resilient means 13 are housed in one container. Connections 11 and 12, attached respectively at opposite ends of the assembly 14, are adapted to link the assembly to instrument components. The assembly 14 includes a housing 142 confining the damping fluid 140, a piston 141 movable in the fluid and attached to the piston rod 144, a fluidtight flexible cover 143 for the housing, with a central aperture 149 in the cover, in which the piston rod 144 is sealed. The piston 141 has a smaller diameter than the inner wall 146 of the housing 142, so that a gap 42 is formed between the outer circumference of the piston and the housing. The solid resilient means 13 is a spiral tension spring which is supported at one end in a circumferential groove 147 formed in the piston rod 144 at its junction with piston 141, and at the other end in a shoulder 148 formed in the inner wall 146 of the housing 142. A felt cylinder 145 of similar elastic means may be interposed between the piston rod 144 and the connecting link 11 for the filtering of high audible frequencies. The material for the cover 143 must be chosen with the view of nullifying the springiness of the air cushion 150 above the fluid 140. If the material can be distorted, the fluctuations in the air cushion which are caused by the oscillations can be compensated for by a deformation of the cover. However, if the cover material is pressure-resistant, the air cushion may be used as spring means, so that the solid spring 13 becomes superfluous.

In FIG. 3 we show essentially the same embodiment as in FIG. 1. A base 2 and a member 1 are interconnected by the helical spring 3. A fluid damper 4 is mounted on the base 2 in parallel alignment with the spring 3 and comprises a container 44 confining the damping fluid 43, and a piston 41 connected to a piston rod 45 and movable in the fluid in the container. A gap 42 exists between the circumference of the piston 41 and the wall of the container 44. The piston rod 45 is attached to the member 1. The container, in the preferred embodiment, is made from elastic material. A clamp 46 surrounds all but a small portion of the circumference of the container 44 and terminates in endpieces 47 and 48 which are spaced from each other and which have apertures 49 and 49a respectively in alignment with one another. A threaded bolt 50 passing through the apertures 49 and 49a is threadedly engageable by a nut for tightening the clamp 46 whereby the dimensions of the gap 42 can be changed.

It will be understood that each of the elements described above, or two or more together, may also find a useful application in other types of shock absorbers differing from the types described above.

While the invention has been illustrated and described as embodied in a damping means having three degrees of freedom, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended

We claim:

1. A shock absorber for electroacoustical instruments comprising a base and a member adapted to receive oscillatory motion; fluid-damping means interposed between said base and said member, said fluid-damping means comprising a container of elastic material for a fluid of preselected viscosity and mounted on said base, a piston in said container spaced by a gap from the container wall, and a piston rod connecting said piston to said member; resilient means operatively connected to said base and said member, said piston and said resilient means having three-dimensional freedom of motion; and a clasp around the periphery of said container at the region of said piston for adjusting said gap between the wall of said container and said piston.

2. A shock absorber as defined in claim 1 wherein said clasp has endpieces spaced from each other, said endpieces having apertures, bolt means passing through said apertures, and a bolt whereby the distance between said endpieces is made variable.

3. A shock absorber as defined in claim 1 comprising solid resilient means having low inherent damping properties.

4. A shock absorber as defined in claim 3, wherein said solid resilient means is a helical spring.

5. A shock absorber as defined in claim 4, wherein one end of said solid resilient means is attached to said base and the other end of said solid resilient means is attached to said member.

6. A shock absorber for electroacoustical instruments comprising a base and a member adapted to receive oscillatory motion; fluid-damping means interposed between said base and said member, said fluid-damping means comprising a container for a fluid of preselected viscosity and mounted on said base, a piston in said container spaced by a gap from the container wall, and a piston rod connecting said piston to said member; and spiral spring means concentrically arranged about said piston rod and abutting with one said piston and with the other end said container, said piston and said spring means having three-dimensional freedom of motion.

7. A shock absorber as defined in claim 6 comprising a shoulder on said piston rod at the junction of said piston rod to said piston, and another shoulder in the wall of said container, for the support of said spiral spring means.

8. A shock absorber as defined in claim 7 comprising a fluidtight flexible cover for said container, said cover having a central aperture for sealing said piston rod.

9. A shock absorber as defined in claim 8, wherein solid elastic means are interposed in series between said piston rod and said member.